（12) United States Patent
Barker et al.

(10) Patent No.: US 6,553,587 B1
(45) Date of Patent: Apr. 29, 2003

(54) METHOD AND APPARATUS FOR ALIGNMENT AND ORIENTATION OF A MONITOR IN A PATIENT SUPPORT SYSTEM

(75) Inventors: David E. Barker, Salt Lake City, UT (US); Jeffrey W. Pattee, Salt Lake City, UT (US); John Matthew Simmons, West Jordan, UT (US)

(73) Assignee: GE Medical Systems Global Technology Company, LLC, Waukesha, WI (US)

( * ) Notice: Subject to any disclaimer, the term of this patent is extended or adjusted under 35 U.S.C. 154(b) by 0 days.

(21) Appl. No.: 09/682,859

(22) Filed: Oct. 25, 2001

(65) Prior Publication Data
(65)

(51) Int. Cl.[7] .................................................. A47F 5/00
(52) U.S. Cl. .................................. 5/600; 5/624; 5/628
(58) Field of Search ............................. 5/600, 624, 658; 248/286.1, 276.1, 917, 921, 923

(56) References Cited

U.S. PATENT DOCUMENTS

| 5,230,112 A | * | 7/1993 | Harrawood et al. ............ 5/607 |
| 5,505,424 A | * | 4/1996 | Niemann ................. 248/288.31 |
| 5,553,820 A | * | 9/1996 | Karten et al. ............. 248/181.2 |
| 5,876,008 A | * | 3/1999 | Sweere et al. ......... 248/280.11 |
| 6,059,417 A | * | 5/2000 | Tatoian ........................ 248/480 |

* cited by examiner

Primary Examiner—Lynne H. Browne
Assistant Examiner—Fredrick Conley
(74) Attorney, Agent, or Firm—McAndrews, Held & Malloy, Ltd.; Peter J. Vogel; Michael A. Dellapenna

(57) ABSTRACT

In accordance with at least one preferred embodiment of the present invention, a patient table comprising a patient support surface for supporting a patient during a medical procedure, a base supporting said patient support surface, a monitor displaying medical information relating to a medical procedure, and a support member mounted to said patient table for supporting said monitor, wherein said support member includes an adjustment linkage interconnecting said monitor and support member and providing movement of said monitor of the monitor relative to said support member in at least three degrees of freedom.

3 Claims, 6 Drawing Sheets

METHOD AND APPARATUS FOR ALIGNMENT AND ORIENTATION OF A MONITOR IN A PATIENT SUPPORT SYSTEM

BACKGROUND OF INVENTION

At least one embodiment of the present invention generally relates to an adjustable monitor for patient tables for supporting patients during medical procedures. More particularly, at least one embodiment of the present invention relates to an adjustable mechanism that allows a user to align and/or orient a monitor to the desired position.

Patient tables and monitors exist in a wide range of medical patient support systems for medical applications, each designed to be used for specific medical procedures. Medical patient support systems typically include a patient support surface that is attached to a support apparatus. The support apparatus may include a mechanism for adjusting the patient table in various directions, including up and down, side to side, and/or into a sitting position. Typically monitors that are used in medical procedures are separate from the patient support system and are positioned on one side of the patient support system.

Conventional urology patient support systems support the patient in at least two positions, lying on their back and sitting up. A urologist often needs to view a monitor while treating a patient In such conventional systems a monitor is on one side of the patient. Urology procedures often require the patient and/or the doctor to be in more than one position. The desired position of the monitor, however, depends on the procedure being performed and the orientation of the doctor and patient relative to the equipment. The monitor therefore may be in an undesirable position or may be difficult to reposition during a procedure. There is a need therefore for a system that allows the monitor to be moved to different positions depending on the position of the patient and/or doctor. Additionally, there is a need for a monitor that can be adjustably aligned, oriented and/or rotated to provide a preferred placement of the monitor.

Although monitors have been used with patient support systems, such monitors have not been easily adjusted to orient or align the monitor.

A need, therefore, exists for an improved medical patient support system that provides a patient table and monitor that may be easily adjusted to provide a desired alignment, orientation and rotation.

SUMMARY OF INVENTION

In accordance with at least one preferred embodiment of the present invention, a patient table comprising a patient support surface for supporting a patient during a medical procedure, a base supporting said patient support surface, a monitor displaying medical information relating to a medical procedure, and a support member mounted to said patient table for supporting said monitor, wherein said support member includes an adjustment linkage interconnecting said monitor and support member and providing movement of said monitor relative to said support member in at least three degrees of freedom.

One aspect of another embodiment of the present invention is a patient table including an adjustment linkage comprising a ball member connected to said monitor, and directional pins securely mounted to said support member and slideably engaging said ball member to permit linear movement in at least one direction corresponding to one degree of freedom.

One aspect of another embodiment of the present invention is a patient table including an adjustment linkage comprising a ball member with a slotted floating guide slideably connected inside said ball member and directional pins securely mounted to said support member and slideably engaging said slotted floating guide to limit the linear motion of the monitor in at least one direction along one degree of freedom.

One aspect of another embodiment of the present invention is a patient table including an adjustment linkage comprising a ball member and a rotatable pin connected to said support member to provide rotation of the monitor about the plane of the monitor.

One aspect of another embodiment of the present invention the patient table is a urological table.

One aspect of another embodiment of the present invention is a patient table comprising a patient support surface for supporting a patient during a medical procedure, a base supporting said patient support surface, a monitor displaying medical information relating to a medical procedure, a support member connected to said patient table and said monitor for supporting said monitor, and a ball shaped member interconnecting said monitor and said support member, wherein said ball shaped member is movably mounted to one of said monitor and said support member to permit movement of said monitor in at least two directions. Optionally, the ball shaped member may include a rotatable pin which allows rotation of the monitor about the plane of the monitor. Optionally the ball shaped member may include directional pins securely mounted to said support member and slidably engaged with said ball shaped member to permit linear motion along one axis.

One aspect of another embodiment of the present invention is a patient table comprising a ball shaped member including a slotted floating guide within said ball shaped member, said slotted floating guide being movable relative to said ball shaped member in at least one direction to permit linear motion along a first axis, and directional pins securely mounted to said support member and slidably engaged with said slotted floating guide to permit linear motion along a second axis perpendicular to said first axis.

One aspect of another embodiment of the present invention is a urology table comprising a patient support surface having opposed ends arranged along a longitudinal axis and having opposed sides arranged transverse to said longitudinal axis, a monitor displaying medical information relating to a medical procedure, a support member connected to said patient table and said monitor for supporting said monitor, and a linkage interconnecting said monitor and said support member, wherein the linkage includes a rotational link providing rotational movement of said monitor and a linear link providing linear movement of said monitor in at least one direction perpendicular to said rotational movement.

One aspect of another embodiment of the present invention is a patient table comprising a patient support surface for supporting a patient during a medical procedure, a base supporting said patient support surface, a monitor displaying medical information relating to a medical procedure, a pivot arm having a first end connected to said base and a second end connected to said monitor, a pivot release member provided on one of said monitor and said pivot arm for releasably securing said monitor and said pivot arm at predetermined angular positions with respect to said base, and an adjustment linkage, said adjustment linkage interconnecting said monitor and said pivot arm and providing movement of said monitor relative to said pivot arm in at least three degrees of freedom.

BRIEF DESCRIPTION OF DRAWINGS

The foregoing summary, as well as the following detailed description of the preferred embodiments of the present invention, will be better understood when read in conjunction with the appended drawings. For the purpose of illustrating the invention, there is shown in the drawings, embodiments which are presently preferred. It should be understood, however, that the present invention is not limited to the precise arrangements and instrumentality shown in the attached drawings.

DETAILED DESCRIPTION

Figure 1:
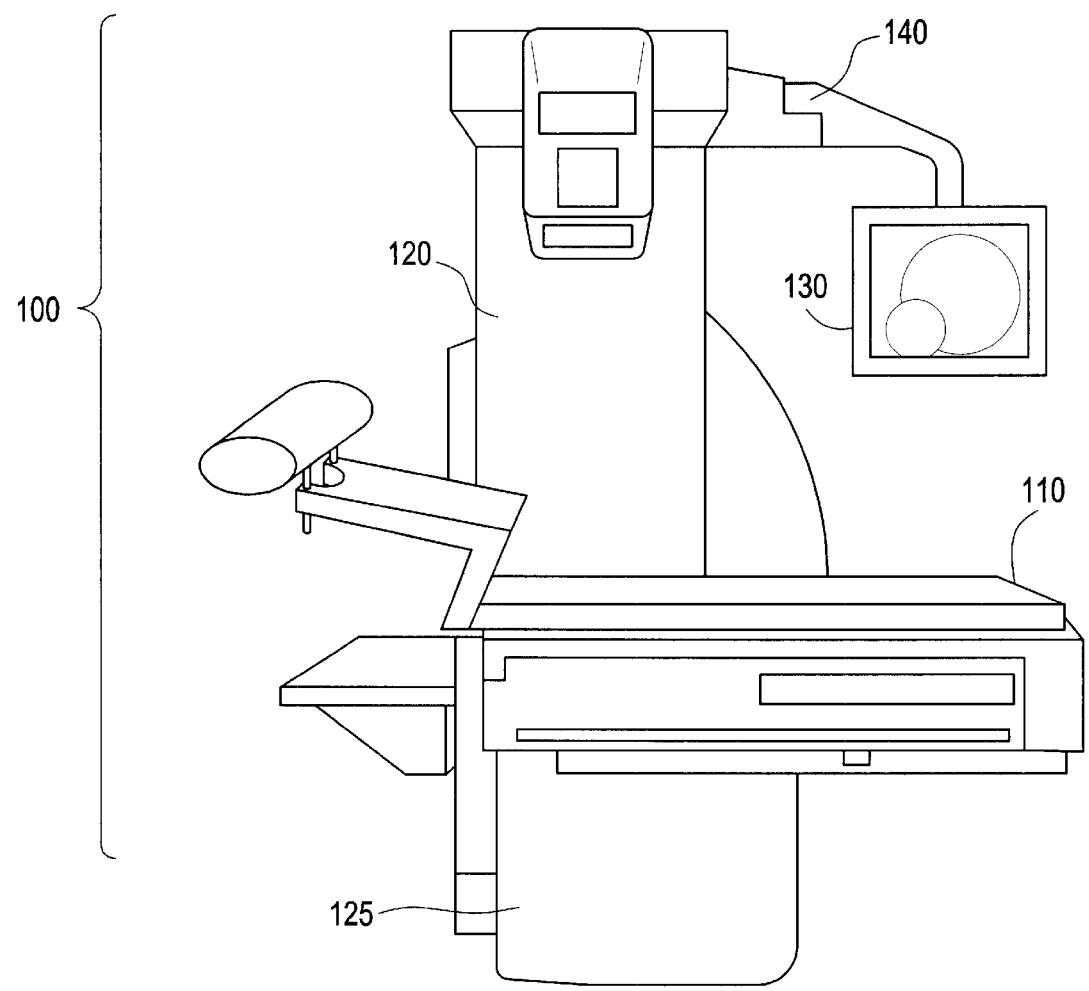
FIG. 1 illustrates a patient support system employing the monitor and adjustment mechanism according to one embodiment of the present invention.

FIG. 1 illustrates a patient support system 100 with a patient support surface 110, a base 120, a monitor 130, a moving mechanism 140 and an adjustment mechanism 150. The base 120 includes a support structure 125, which supports the patient support system 100. The patient support surface 110 is attached to and supported by the base 120. The monitor 130 is attached to the adjustment mechanism 150, which is attached to the moving mechanism 140. The moving mechanism 140 is attached to the base 120 and supports the monitor 130. The monitor 130 is preferably a flat screen monitor. The moving mechanism 140 allows the monitor 130 to be moved and locked into different desired positions.

Figure 2:
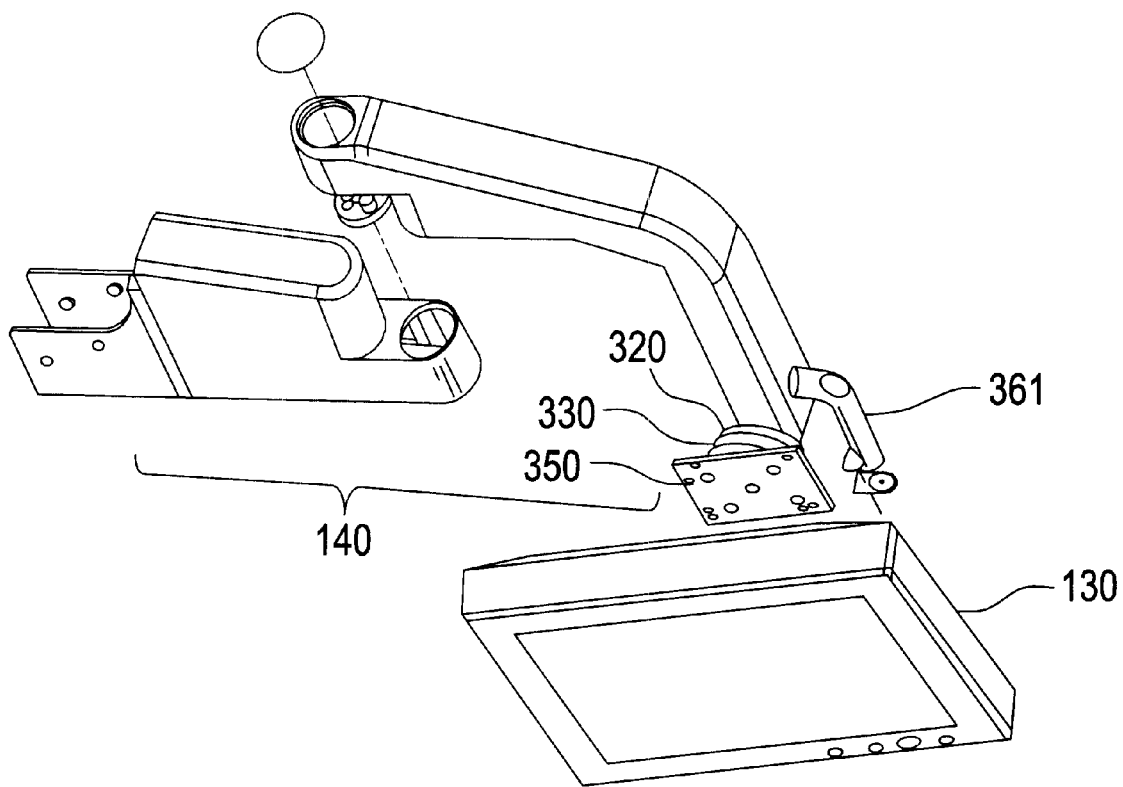
FIG. 2 illustrates a moving mechanism, adjustment mechanism and monitor according to one embodiment of the present invention.

The moving mechanism 140 rotates the monitor 130 about a pivot axis, which is perpendicular to the monitor 130 plane. As shown in FIG. 2, the adjustment mechanism 200 is connected to the end of the moving mechanism 140. The adjustment mechanism 200 allows the monitor to be moved in three degrees of freedom relative to the moving mechanism 140.

Figure 3:
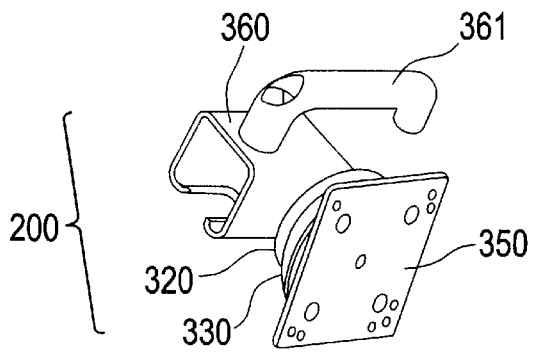
FIG. 3 illustrates an adjustment mechanism according to one embodiment of the present invention.
Figure 4:
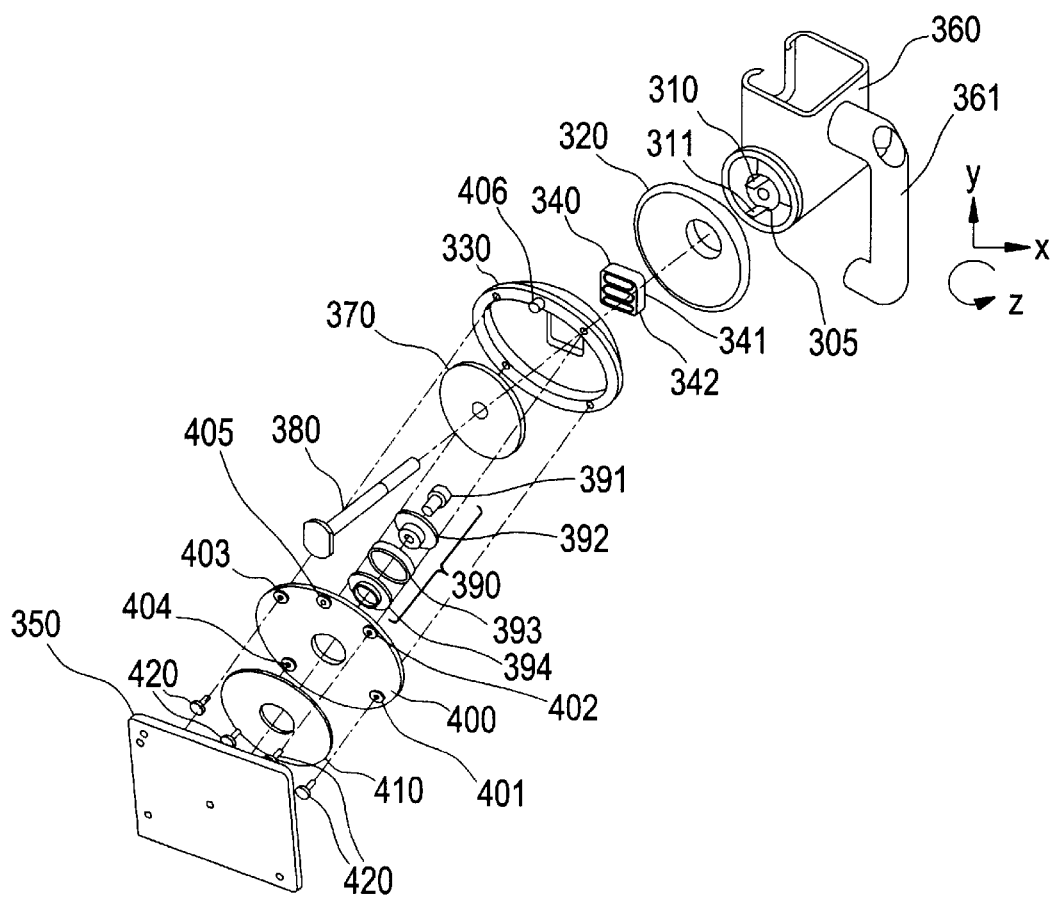
FIG. 4 illustrates an adjustment mechanism according to one embodiment of the present invention.

FIGS. 3 and 4 illustrate the adjustment mechanism 200 formed in accordance with one embodiment of the present invention. FIG. 3 shows a side view of the adjustment mechanism 200, including the monitor plate 350, the second spherical member 330, first spherical member 320, support member 360 and handle 361. The support member 360 is hollow and is attached to the moving mechanism 140. The support member 360 has a first circular opening with a circular frame 305. Directional pins 310, 311 are securely mounted to the circular frame 305. The first spherical member 320 fits into the circular opening in the support member 360. Directional pins 310, 311 pass through an opening in the center of the first spherical member 320.

Figure 5:
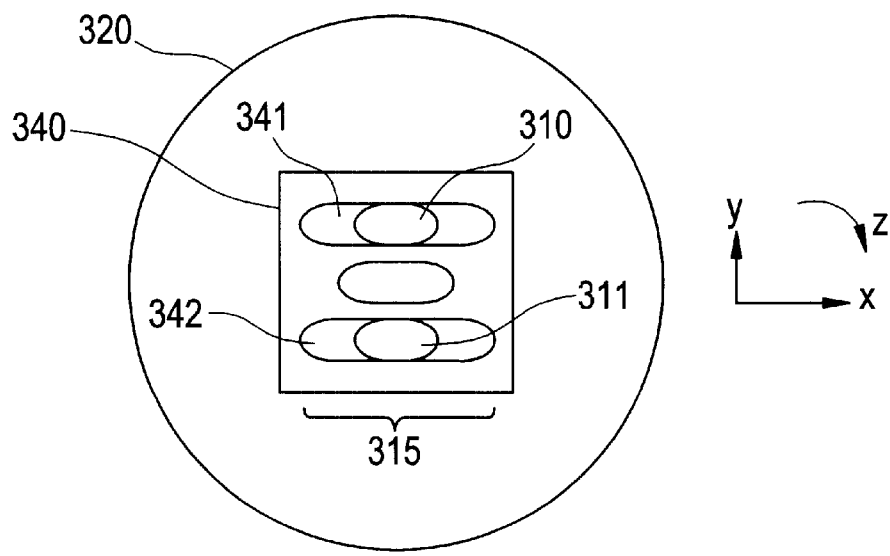
FIG. 5 illustrates a frontal view of a partial assembly of an adjustment mechanism according to one embodiment of the present invention.

The slotted floating guide 340 is generally rectangular, square or the like. The slotted floating guide 340 includes two parallel horizontal slots 341, 342. The directional pins 310, 311 engage the slots 341, 342 and slide horizontally within slots 341, 342 allowing the monitor 130 to be moved in one degree of freedom. FIG. 5 illustrates a front view of a partial assembly of the adjustment mechanism 200, including the slotted floating guide 340, the first spherical member 320 and directional pins 310, 311. Directional pins 310, 311 move over a range of motion defined by the ends of slots 341, 342, as shown by range 315.

Figure 6:
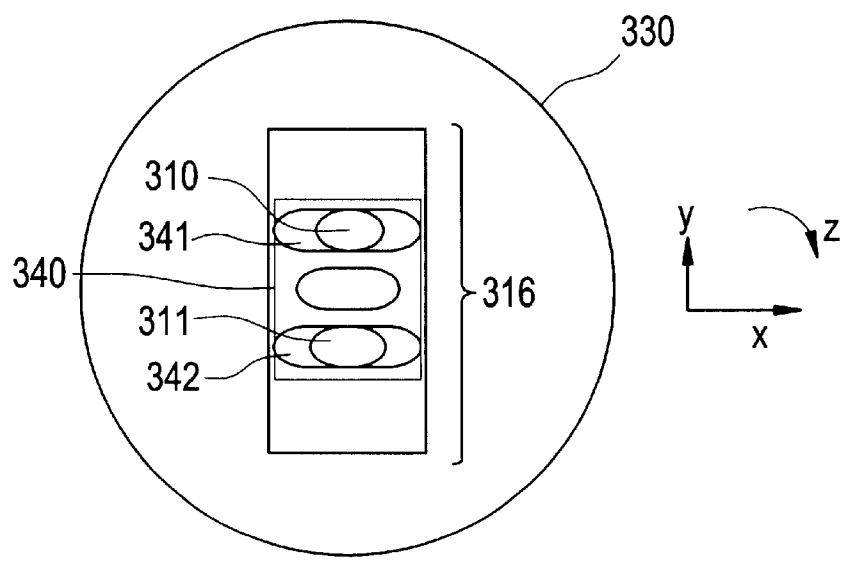
FIG. 6 illustrates a frontal view of a partial assembly of an adjustment mechanism according to one embodiment of the present invention.

The second spherical member 330 is spherical in shape and includes a rectangular, square or the like hole in the middle of it. The second spherical member generally fits within the first spherical member .320 and may move within the first spherical member 320. The hole in the second spherical member 330 is the same width as the slotted floating guide 340 and taller than the slotted floating guide 340. The slotted floating guide 340 fits into the hole in the second spherical member 330 and allows the monitor 130 to be moved in a second degree of freedom. FIG. 6 illustrates a front view of a partial assembly of the adjustment mechanism 200, including the second spherical member 330, the slotted floating guide 340, and directional pins 310, 311. The slotted floating guide 340 moves over a range of motion defined by the height of the hole in the second spherical member 330, as shown by range 316.

A first disc 370 acts as a washer and fits within. the outer diameter of the second spherical member 330. A screw 380 passes through the first disc, the slotted floating guide 340 within the second spherical member 330, the first spherical member 320 and is secured to the circular frame 305.

The directional pins 310, 311, first spherical member 320, second spherical member 330, slotted floating guide 340, first disc 370 and screw 380 permit the monitor 130 to be moved in two linear directions (the x and y axis shown in FIG. 4). The size of the hole in the second spherical member 330 and the height of the slotted floating guide 340 may be varied to provide a different range of motion along the y axis. The width of the slots 341, 342 and the size of directional pins 310, 311 may be varied to provide a different range of motion along the x axis.

The adjustment mechanism 200 may also include a swivel assembly 390, a connecting disc 400 and a washer 41 0. The swivel assembly 390 includes a shoulder washer 394, spring 393, shoulder 392 and screw cap 391. The spring 393 fits over the shoulder 392 and the shoulder washer 394 fits over the spring 393. The shoulder washer 394 extends through the hole in the connecting disc 400.

The connecting disc 400 is a larger circular disc with a hole in the middle that securely fits over the shoulder washer 394. The connecting disc 400 also includes holes 401, 402, 403, 404 along the outside for fasteners 420 to pass through. A washer 410 rests between the connecting disc 400 and the monitor plate 350. The screw cap 391 extends through the shoulder 392, spring 393, shoulder washer 394, connecting disc 400 and washer 410 and connects to the monitor plate 350.

Fasteners 420 connect the connecting disc 400 to the second spherical member 330, and hold the padded disc 410 and swivel assembly 390 in place. Hole 405 of the connecting disc 400 fits over peg 406 of the second spherical member 330 to hold the connecting disc 400 in place. The monitor 130 is connected to the monitor plate 350. The swivel assembly 390 allows the monitor 130 to be moved in a third degree of freedom. Spring 393 is set such that shoulder washer 394 or washer 410 contact monitor plate 350. Monitor plate 350 and swivel assembly 390 rotate around the monitor plate plane (in the z direction as shown in FIG. 4), while the connecting disc 400 and the other parts of the adjustment mechanism remain rigid. The swivel assembly 390 holds the monitor plate 350 in its selected orientation once the monitor 130 has been rotated.

In operation, the monitor 130 is held in place by the adjustment mechanism 200. The user moves the monitor 130 in a horizontal (along the x axis) and/or vertical (along the y axis) linear direction and/or rotates the monitor 130 (along the z arrow) about the plane of the monitor 130. When the monitor 130 is moved horizontally (along the x axis) the second spherical member 330 slides left to right within the first spherical member 320 and the slotted floating guide 340 slides along the directional pins 310, 311. The directional pins 310, 311 restrict horizontal movement after a predetermined point. When the monitor 130 is moved vertically (along the y axis) the second spherical member 330 slides up and down within the first spherical member 320 and the slotted floating guide 340 moves up and down within the hole in the second spherical member 330. When the monitor 130 is rotated (along the z arrow) the swivel assembly 390, washer 410 and monitor plate 350 rotate. The swivel assembly 390 holds the monitor 130 in place once it has been rotated to a selected position.

Figure 7:
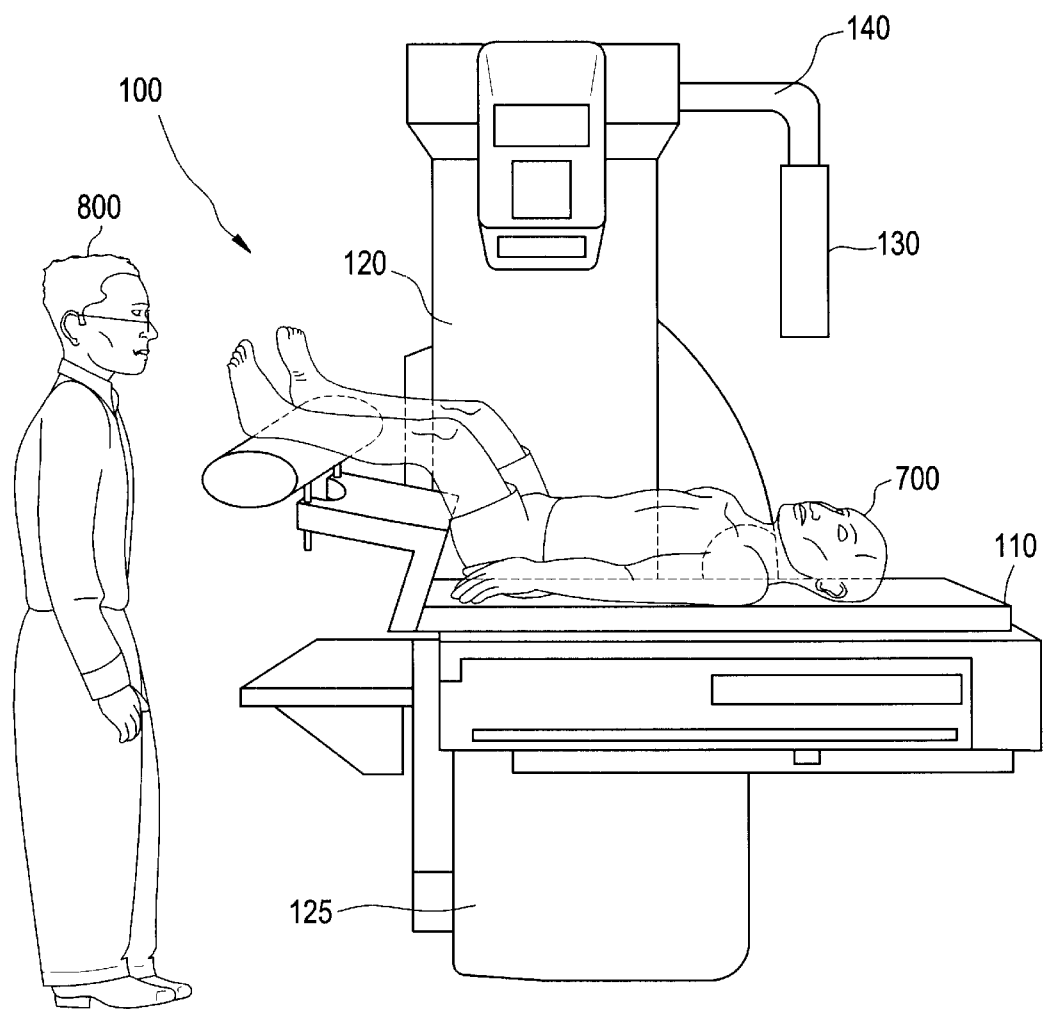
FIG. 7 illustrates a urology patient support system according to one embodiment of the present invention.
Figure 8:
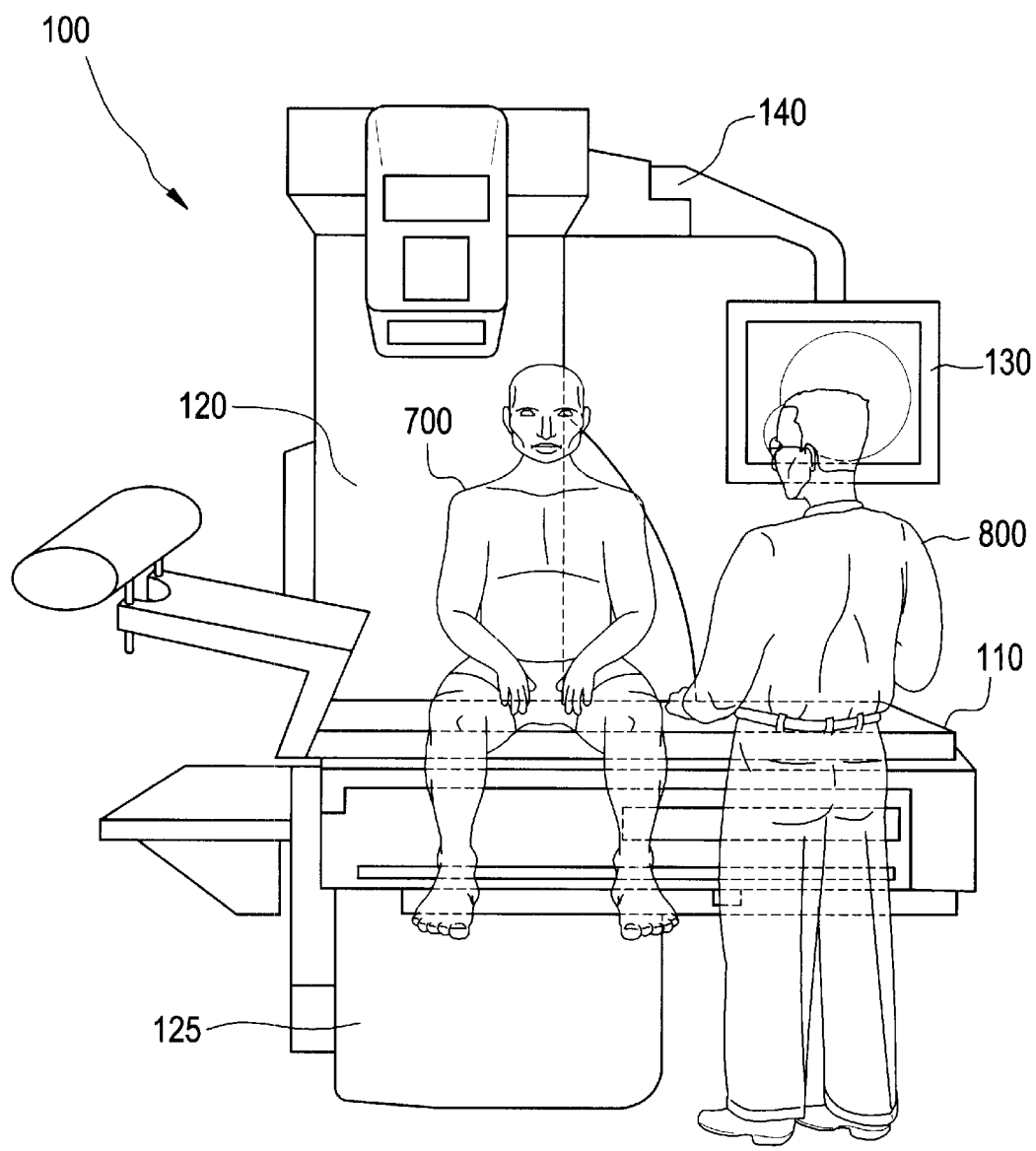
FIG. 8 illustrates a urology patient support system according to one embodiment of the present invention.

FIGS. 7 and 8 show, by way of example only, urology patient support systems 100 with two typical patient and doctor positions. In the first position, as shown in FIG. 7, the patient 700 is laying down on the patient support surface 110 and the doctor 800 is seated or standing near the legs of the patient 700. In this position, one desired monitor 130 location is over the patient's chest. In the second position, as shown in FIG. 8, the patient 700 is sitting upright and the doctor 800 is located at the patient's legs. In this position, one desired monitor 130 location is over the patient's head. A preferred embodiment of the present invention allows a doctor 800 or another person to easily and safely align and/or orient the monitor 130 in multiple positions to provide the optimum placement of the monitor 130 as shown in FIGS. 7 and 8.

The present invention may also be used in connection with the invention disclosed in U.S. patent application No. 09/682,860, and applicants hereby incorporate by reference application No. 09/682,860 in its entirety.

While the invention has been described with reference to a preferred embodiment, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

What is claimed is:

1. A patient table comprising:

a patient support surface for supporting a patient during a medical procedure;

a base supporting said patient support surface;

a monitor displaying medical information relating to a medical procedure;

a support member connected to said patient table and said monitor for supporting said monitor; and a ball shaped member interconnecting said monitor and said support member, wherein said ball shaped member is movably mounted to one of said monitor and said support member to permit movement of said monitor in at least two directions;

wherein said ball shaped member further comprises a slotted floating guide within said ball shaped member, said slotted floating guide being movable relative to said ball shaped member in at least one direction to permit linear motion along a first axis, and directional pins securely mounted to said support member and slidably engaged with said slotted floating guide to permit linear motion along a second axis perpendicular to said first axis.

2. The patient table of claim 1, wherein said ball shaped member further comprises a rotatable pin which allows rotation of the monitor about the plane of the monitor.

3. The patient table of claim 1, wherein said patient table is a urological table.

* * * * *